United States Patent [19]

Streck

[11] 3,773,464
[45] Nov. 20, 1973

[54] ACID AND DIRECT DYES AND FLUORESCENT BRIGHTENER CONCENTRATES WITH THIOCYANATES AND ACETYLINIC ALCOHOL

[75] Inventor: Clemens Streck, Loudonville, N.Y.

[73] Assignee: GAF Corporation, New York, N.Y.

[22] Filed: June 2, 1970

[21] Appl. No.: 46,849

[52] U.S. Cl............................ 8/93, 8/82, 252/301.2
[51] Int. Cl................................................ D06p 1/68
[58] Field of Search...................... 8/79 AD, 79, 93, 8/173; 252/301.2 W

[56] References Cited
UNITED STATES PATENTS

| | | | |
|---|---|---|---|
| 3,201,189 | 8/1965 | Mautner | 8/180 |
| 3,158,434 | 11/1964 | Fleysher | 8/93 X |
| 2,997,447 | 8/1961 | Russell | 8/93 UX |
| 2,552,807 | 5/1951 | Normand | 8/173 |
| 2,518,644 | 8/1950 | Seymour | 8/173 |

OTHER PUBLICATIONS

Knecht & Fothergill, "The Principles and Practices of Textile Printing," 3rd Ed., London, 1936 (Chas. Griffe & Co., Ltd.), pages 410–411.
Jacobs, "Textile Printing," 1952, pages 148–149.
Chem. Abstracts, 1968, Abstract 81678 and QD1A50.

*Primary Examiner*—Donald Levy
*Attorney*—Walter C. Kehm and Homer J. Bridger

[57] ABSTRACT

Pourable, stable aqueous solutions to pastes consisting essentially of about 5–50% by weight of an acid dyestuff, a direct dyestuff or a flourescent brightening agent containing at least 1 sulfonic acid substituent and about 1–20% by weight of a water soluble thiocyanate such as ammonium thiocyanate. Such compositions are characterized by greater stability and fluidity and increased color value, as compared with a solution or paste, of the same concentration, of such dyestuffs but which do not contain a water soluble thiocyanate. The incorporation of a small amount, about 0.1–2% by weight, of an acetylenic glycol into such compositions, in the case of many dyestuffs further enhances the stability, fluidity and/or color value of the composition.

12 Claims, No Drawings

ACID AND DIRECT DYES AND FLUORESCENT BRIGHTENER CONCENTRATES WITH THIOCYANATES AND ACETYLINIC ALCOHOL

The present invention relates to novel dyestuff compositions and is particularly directed to concentrated aqueous solutions or pastes of an acid dye, a direct dye or a fluorescent brightening agent, having at least one sulfonic acid substituent, which also contain a water soluble thiocyanate as a fluidizer and stabilizer.

BACKGROUND OF THE INVENTION

For many years most dyestuff compositions were manufactured and sold as dry powders, which were dissolved in water at the point of use when added to the dyebath. In recent yers, however, there has developed a considerable demand for solutions or pourable pastes of dyestuffs. Such solutions or pastes have the obvious advantage, as compared to many dye powders, that they are not subject to dusting and thus do not fly around and contaminate the environment. They also have the advantage that they are easier or more convenient to use, since the dyer is spared the onus of redissolving the dyestuff to produce a solution suitable for use. They also have the advantage that they are easier to remove from the shipping container and are easier to measure, since they may be measured accurately by volume instead of weighing. This latter advantage is particularly important in installations involving continuous dyeing operations, where it is desirable to meter a dyestuff solution or paste into the system.

In spite of their many advantages to the user, it is not always practical for the dyestuff manufacturer to supply a solution or paste of dyestuff to the user. The large amount of water or solvent necessary for a stable solution is expensive in transportation and packaging. Many dyestuffs in concentrated solutions or pastes tend to set up to a gel or solid which is difficult to remove from the container. In other cases the dye tends to separate out, in a form which is difficult to redisperse or redissolve to a uniform liquid.

SUMMARY OF THE INVENTION

I have now found that if a water soluble thiocyanate is incorporated into a concentrated solution or paste of certain dyestuffs several benefits result. The solution or paste has a lower viscosity and is more flowable or pourable than a solution or paste of the same degree of concentration, but without the thiocyanate. Also the solution or paste containing the water soluble thiocyanate has greater color value, ie., when used for dyeing, stronger and bright shades are obtained.

THE PRIOR ART

It is not unknown to use thiocyanates in the dyeing art, particularly in the textile dyeing and printing field. For example, "The Principles and Practice of Textile Printing," E. Knecht and J. B. Fothergill, 3rd Ed., London, 1936 (Chas. Griffin and Co. Ltd.) pages 410 and 411 illustrate its use as the acid component in printing with leuco vat dyes.

"Textile Printing," Fred F. Jacobs, 1952, Chartwell House, New York, at pages 148 and 149 describes its use as an acid-splitting salt in dyeing wool with metallized dyes.

U.S. Pat. No. 3,201,189, Henry R. Mautner issued Aug. 17, 1965 describes their use in a process for dyeing polypropylene fibers with acid dyestuffs.

However, so far as I am aware, it has not been recognized heretofore that ammonium thiocyanate or other water soluble thiocyanates can be used to produce more flowable concentrated solutions or pastes of dyestuffs.

DETAILED DESCRIPTION

As stated above, the compositions of the present invention consist essentially of about 5–50% by weight of dyestuff and about 1–20% by weight of a water soluble thiocyanate, the balance being principally water. It is of course preferable that these compositions be as concentrated as possible; i.e., contain about the maximum amount of dyestuff and the minimum amount of water as is possible while still providing a composition having the desired consistency; i.e., the desired degree of fluidity or pourability; since by doing so the volume and weight of the composition is kept at a minumum with resultant lowering of the packaging and shipping cost thereof. The maximum amount of dyestuff that can be incorporated in the compositions of the present invention while still maintaining the consistency and stability of the composition in the desired range, will, of course, vary with the particular dyestuff or combination of dyestuffs used, but can be determined for any particular dyestuff by preliminary test. I have found however that for any particular consistency, the compositions of the present invention which contain a water soluble thiocyanate will contain a substantially greater amount of any given dyestuff than a solution or paste of the same dyestuff made up to the same consistency but omitting the thiocyanate. Since a pourable paste has the obvious advantage that the amount of water therein is maintained at a minimum, such pourable pastes, which can be considered as a dispersion of dyestuff in a concentrated solution of the dyestuff, represent the preferred embodiment of the present invention.

I prefer to employ ammonium thiocyanate or sodium thiocyanate as the water soluble thiocyanate in practicing this invention since these materials are readily available, are relatively inexpensive and have been found to be very satisfactory. However, other water soluble thiocyanates may also be used and as examples thereof may be mentioned water-soluble alkali metal, alkaline earth metal and metal thiocyanates, such as potassium, calcium, magnesium, barium, strontium, zinc, aluminum, tin, cadmium, and lithium thiocyanates; also guanidine, mono-(lower alkyl) substitued guanidine and symmetrical and unsymmetrical di-(lower alkyl) substituted guanidine thiocyanates, wherein the lower alkyls may be methyl, ethyl or the like.

The compositions of the present invention in which the dyestuff employed is a direct dye, represent a particularly preferred embodiment, and have been found to be particulary adapted for use in the dyeing of paper pulp by the beater method. The pourable pastes of direct dyes employed for the dyeing of paper, which are produced in accordance with this invention, have been found to be especially suited for use in paper mills equipped with metering systems for adding the dye to the pulp in a continuous operation.

Direct dyes, also frequently called "substantive dyes," are those dyestuffs which dye cellulosic (cotton)

fibers directly, and are a recognized class of dyes in the dyestuff art. I have found that the direct dyes, as a class, are operative in the compositions of this invention. Chemically many of the direct dyes are azo dyes, prepared by coupling the diazo compounds of benzidine, tolidine, dianisidine, diaminostilbene disulfonic acid, J acid, or diamines such as p-phenylenediamine, m-toluylenediamine or naphthylenediamine with phenols or amines or their derivatives. Certain specific preferred direct dyes are illustrated in the specific examples given below; however numerous other direct dyes are well known and commercially available and may be used in practicing this invention. They include those classified as "Direct Dyes" in the Colour Index, 2nd Edition, 1956, published jointly by the Society of Dyers and Colourists (Great Britain) and The American Association of Textile Chemists and Colorists (U.S.A.) at pages 2001–2359 (Vol. 2), and others of this class subsequently developed.

The "Acid dyes", e.g. those dyes which are normally used to dye wool and silk from an acid bath, which may be used in the present invention, are also an art recognized class of dyes. Chemically they include dyes from the following classes: azo, triarylmethane, xanthene, anthraquinone, nitro, pyrazalone, thiazole, azine, thiazine etc. Specific acid dyes which may be used in practicing this invention include those classified as Acid Dyes in the Colour Index at pages 1001–1404 (Vol. 1) and others of this class subsequently developed. A more limited list of preferred acid dyes is as follows:

| Colour Index Name | Colour Index No. |
|---|---|
| Direct Yellow 12 | 24895 |
| Acid Orange 7 | 15510 |
| Acid Yellow 36 | 13065 |
| Acid Orange 8 | 15575 |
| Acid Blue 22 | 42755 |
| Acid Violet 17 | 42650 |
| Acid Blue 45 | 63010 |
| Acid Blue 41 | 62130 |
| Acid Blue 27 | 61530 |
| Acid Blue 69 | 63610 |
| Acid Blue 40 | 62125 |
| Acid Blue 78 | 62105 |
| Acid Blue 25 | 62055 |
| Acid Green 25 | 61570 |
| Acid Red 80 | 68215 |

Fluorescent brightening agents, of which those that have at least one sulfonic acid substituent (usually in the form of an alkali metal salt, e.g. sodium salt) in their structure can be used in practising the present invention, are also an art recognized class of dyestuffs. They are compounds which have little color themselves under visible light, but when applied to, or incorporated in, textiles or paper for example, absorb light in the ultra violet range and emit it, i.e. fluoresce, in the visible range, preferably the blue to green wavelengths. Fluorescent brightening agents having a bluish to greenish fluorescence are therefore frequently used in textiles or paper, since under ultraviolet light, such as that in daylight, they tend to neutralize any yellowness of the textiel or paper and make it appear whiter and brighter. As examples of specific fluorescent brightening agents which may be used in practicing the present invention may be mentioned those sulfonated materials classified as such in the Colour Index pages 2907–2923 (Vol. 2). Numerous other fluorescent brightening agents are known in the art, and as further examples of those that may be used in practicing this invention may be mentioned the sulfonated fluorescent brightening agents disclosed in the patents listed below:

1) Stilbene disulfonic acid type

U. S. Patents:
| 2,526,668 | 2,674,604 | 2,778,827 |
| 2,539,766 | 2,676,982 | 3,127,270 |
| 2,595,030 | 2,703,801 | 3,132,106 |

2) Dibenzothiophene-5,5-dioxide type

U. S. Patents:
| 2,563,493 | 2,573,652 | 2,911,415 |
| 2,563,795 | 2,702,759 | 3,031,460 |
|           | 2,733,165 |           |

3. Benzoxazole type
   Belgian Pat. 711,769
   British Pat. 1,115,614
   British Pat. 1,126,067
   Japanese Pat. 12,927 (1968)
4. Pyrazoline type
   Belgian Pat. 706,796
   Belgian Pat. 729,261
   British Pat. 1,154,608
5. 1, 8-Naphthalene dicarboxylic type
   Japanese Pat. 11,772 (1964)
   Japanese Pat. 15,469 (1965)
   Japanese Pat. 16,303 (1967)
6. Coumarin type
   Japanese Pat. 18,958 (1969), Netherlands Application 6,603,113
7. Triazole type
   U.S. Patent Nos. 2,666,062; and 2,704,286
8. Benzimidazole type
   U.S. Pat. No. 2,463,264
9. Oxadiazole type
   U.S. Pat. Nos. 2,765,304 and 2,845,419
10. Furane type
    U.S. Pat. No. 2,751,383

While dyestuffs of the type specified above and a water soluble thiocyanate are the essential ingredients of my novel composition, I have found that certain acetylenic glycols, when incorporated in these compositions to the extent of about 0.1–2% by weight, frequently impart a further improvement in fluidity to the resultant dye pastes. The acetylenic glycols which are suitable for use in practicing the present invention are those represented by the following general formula:

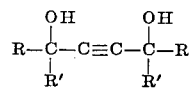

wherein R and R' are hydrocarbon radicals, e.g., alkyl (preferably of one to eight carbon atoms) such as methyl, ethyl, propyl, isopropyl, butyl, sec. butyl, t-butyl, hexyl, heptyl, iso-octyl, octyl, etc., Cycloalkyl such as cyclopropyl, cyclohexyl, etc., Aryl such as phenyl, naphthyl, etc., aralkyl such as benzyl, 2-phenylethyl, 4-phenylbutyl, etc., or alkaryl such as o-, m- or p-tolyl, ethylphenyl, t-butylphenyl, xylyl, and the like. Such acetylenic glycols are well known in the art and are described, together with methods for their preparation, in U.S. Pat. Nos. 2,106,180 and 2,250,445. A particularly preferred class of such tertiary acetylenic glycols, and specific examples thereof, are disclosed in U.S. Pat. No. 2,997,447, German patent 956,217 and British patent 946,646 directed to their use for reducing the surface tension and increasing the wetting properties of aqueous systems. As examples of preferred representative acetylenic glycols which I may use may be mentioned:

2,4,7,9-tetramethyl-5-decyne-4,7-diol
4,7-dimethyl-5-decyne-4,7-diol
2,3,6,7-tetramethyl-4-octyne-3,6-diol
3,6-diethyl-4-octyne-3,6-diol
2,5-dicyclopropyl-3-hexyne-2,5-diol
3,6-dimethyl-4-octyne-3,6-diol
2,5-diphenyl-3-hexyne-2,5-diol
2,5-dimethyl-3-hexyne-2,5-diol
5,8-dimethyl-6-dodecyne-5,8-diol.

Other additives, especially additives commonly used or required in the particular application of the specific dyestuff employed in the compositions of this invention, frequently are compatible with my novel compositions, and if so may be incorporated therein if desired. However, it is not necessary to do so, since such other additives may be added at the point of use. As an example of such other additives which may be incorporated in my novel compositions may be mentioned disodium phosphate and sodium metasilicate which are frequently used in the dyeing of paper pulp by the beater method.

The novel compositions of my invention are readily prepared by intimately mixing together, preferably with milling, as in a ball mill or other attrition mill, suitable for grinding and milling wet pastes, the several components of these compositions in the proper proportions. In formulating these compositions the dyestuff employed therein may be added as a dry pulverent material which has been standardized if desired. However it is not essential that the dyestuff be standardized for use in this invention. In order to effect maximum economy in manufacture, it is frequently desirable to use the dyestuff in the form of a presscake, since by doing so any intermediate drying of the dyestuff may be dispensed with.

The details of the present invention will be apparent to those skilled in the art from a consideration of the following specific examples of preferred embodiments thereof. In these examples the dyestuffs employed are identified by their Colour Index name and number.

EXAMPLE 1

83 parts by weight of dry unstandardized Direct Yellow 11, C.I. No. 40000
4 parts by weight of disodium phosphate (anhydrous)
25 parts by weight of ammonium thiocyanate, and
288 parts by weight of water
400 parts by weight of total were well mixed and then put through a Mantor Gaulen mill. A smooth pourable paste was obtained which was stable on storage. By way of contrast a paste prepared in similar manner using the same amounts of materials, except that the ammonium thiocyanate was omitted, had a much higher viscosity and was much less pourable.

EXAMPLES 2–14

Using the same procedure as that described in Example 1 above, compositions having the formulations given in Table I below were prepared by mixing together the amounts of materials given in the table and putting them through a Mantor Gaulen Mill. In each case a smooth pourable paste, in each instance, were much more pourable than were pastes prepared in a similar manner, and of similar composition, but without the ammonium thiocyanate. The dyes used in these pastes were commercially available unstandardized dyes which are identified in the table by Colour Index name and number. The product Surfynol 104E was an acetylenic glycol manufactured and sold by Air Reduction Chemical & Carbide Co. under that tradename, it is a 50% solution in ethylene glycol of 2,4,7,9-tetramethyl-5-decyne-4,7-diol.

TABLE I

| Ex. | Dyestuff colour index Name | Number | Parts[1] | NH$_4$SCN, parts[1] | Na$_2$HPO$_4$ anhyd., parts[1] | Surfynol 104E, parts[1] | Water, parts[1] | Total parts[1] |
| --- | --- | --- | --- | --- | --- | --- | --- | --- |
| 2 | Direct Yellow 6 | 40001 | 83 | 25 | 4 | 0 | 288 | 400 |
| 3 | {Direct Yellow 6 | 40001 | 20 | | | | | |
|   | {...do... | 40001/6 | 35 | 25 | 4 | 0 | 316 | 400 |
| 4 | Direct Red 81 | 28160 | 35 | 30 | 0 | 2 | 413 | 500 |
| 5 | Acid Red 137 | 17755 | 75 | 25 | 0 | 0 | 300 | 400 |
| 6 | Direct Blue 80 | | 52 | 25 | 0 | 4 | 319 | 400 |
| 7 | Direct Violet 9 | 27885 | 42 | 25 | 0 | 4 | 329 | 400 |
| 8 | {Direct Blue 15 | 24400 | 8 | | | | | |
|   | {Direct Blue 6 | 22610 | 55 | 20 | 0 | 3 | 114 | 200 |
| 9 | Direct Orange 15 | 40002/3 | 70 | 25 | 4 | 0 | 301 | 300 |
| 10 | Direct Yellow 4 | 24890 | 70 | 10 | 5 | 0 | 65 | 150 |
| 11 | Acid Orange 8 | 15575 | 85 | 25 | 4 | 0 | 286 | 400 |
| 12 | Acid Yellow 36 | 13065 | 85 | 25 | 4 | 0 | 286 | 400 |
| 13 | Acid Blue 27 | 61530 | 85 | 25 | 4 | 0 | 286 | 400 |
| 14 | Blancophor RG | | 70 | 25 | 4 | 0 | 301 | 400 |

[1] All parts are by weight.

NOTE.—Blancophor RG is:

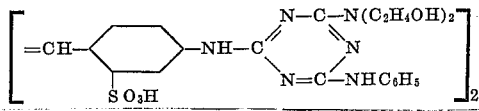

EXAMPLE 15

One hundred fifty-three parts (by weight) of presscake (50% solids content) of Colour Index Direct Blue 1, C.I.No. 24410., 30 parts of ammonium thiocyanate and 67 parts of water were mixed well and then put through a Mantor Gaulen Mill. There was thus produced a paste which was stable on storage (e.g. maintained a stable consistency and its homogeneity) and was readily pourable from the container. By way of contrast a control paste prepared in a similar manner, but without the ammonium thiocyanate, was of much higher viscosity and less pourable.

The stable pourable dye pastes, produced in the foregoing Examples 1–15, when evaluated in the dyeing of paper produced dyeings of stronger and brighter shades than the dyeings produced by control pastes which contained no ammonium, or other, thiocyanate, but were otherwise the same and applied in a similar manner and at the same strength. For the sake of completeness of disclosure, the method of dyeing used for these evaluations is described in Example 16 below.

EXAMPLE 16

Three grams of dry paper pulp were dispersed in 100cc. of water by stirring well. When the pulp was well dispersed, sufficient of the dye paste under test to give 0.25% (based on the weight of the pulp) of dry dyestuff was added and stirred in for about one minute. 2% of rosin size was then added and stirring continued for about one minute at which time 2.5% of alum was added and stirring continued for an additional 20 minutes. A paper sheet was then formed by filtering the pulp, pressing the wet sheet on filter paper and drying in an oven.

I claim:

1. A stable, pourable aqueous dye paste consisting essentially of: water and
   a. about 5–50% by weight of a water soluble dyestuff selected from the group consisting of acid dyes, direct dyes, and fluorescent brightening agents having at least one sulfonic acid group,
   b. about 1–20% by weight of a water soluble thiocyanate as fluidity and stability agent and
   c. from 0.1 to about 2% by weight of a water soluble acetylenic glycol of at least eight carbon atoms and having the formula:

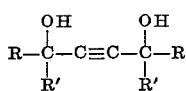

wherein R and R' are hydrocarbon radicals.

2. A stable, pourable aqueous dye paste as defined in claim 1, wherein the dyestuff is an acid dye.

3. A stable, pourable aqueous dye paste as defined in claim 2 wherein the water soluble thiocyanate is ammonium thiocyanate.

4. A stable, pourable aqueous dye paste as defined in claim 2 wherein the acid dye is selected from the group consisting of, Colour Index, Direct Yellow 12, Acid Orange 7 and 8, Acid Yellow 36, Acid Blue 22, 25, 27, 40, 41, 45, 67, 69 and 78, Acid Violet 17, Acid Green 25 and Acid Red 80.

5. A stable, pourable aqueous dye paste as defined in claim 4, wherein the water soluble thiocyanate is ammonium thiocyanate.

6. A stable, pourable aqueous dye paste as defined in claim 1, wherein the dyestuff is a direct dye.

7. A stable, pourable aqueous dye paste as defined in claim 6, wherein the water soluble thiocyanate is ammonium thiocyanate.

8. A stable, pourable aqueous dye paste as defined in claim 6, wherein the direct dye specified is a paper dye.

9. A stable, pourable aqueous dye paste as defined in claim 7, wherein the water soluble thiocyanate is ammonium thiocyanate.

10. A stable, pourable aqueous dye paste as defined in claim 1, wherein the dyestuff is a fluorescent brightening agent having at least one sulfonic acid substituent.

11. A stable, pourable aqueous dye paste as defined in claim 10, wherein the water soluble thiocyanate is ammonium thiocyanate.

12. A stable, pourable aqueous dye paste as defined in claim 1 wherein R and R' may be a radical selected from the group consisting of $C_{1-8}$ alkyl, cyclo alkyl and aryl.

* * * * *